Sept. 23, 1952        A. G. HANESSE        2,611,160
DEVICE FOR ASSEMBLING STRUCTURAL ELEMENTS
Filed June 22, 1948        3 Sheets-Sheet 1
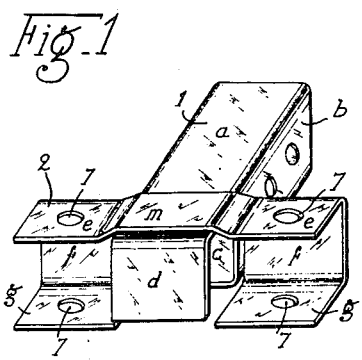
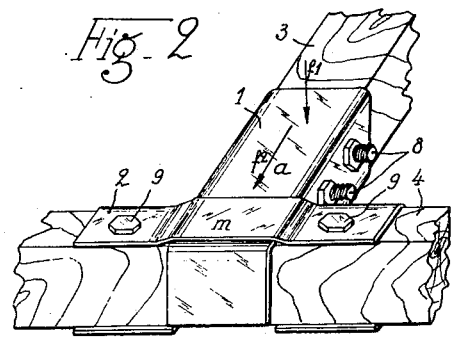
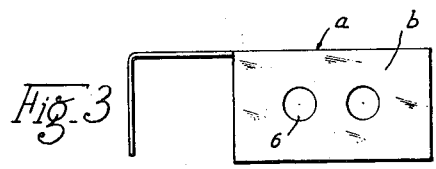
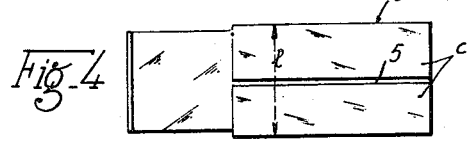
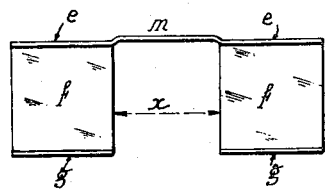
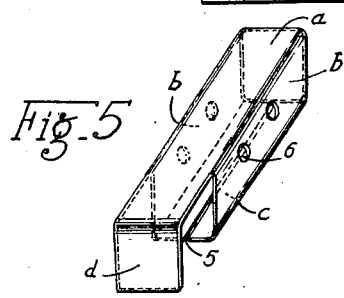
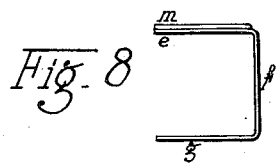
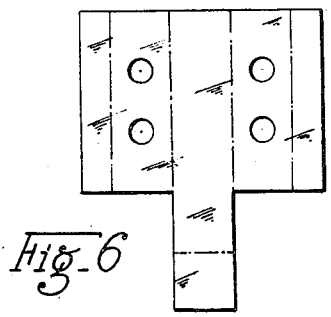
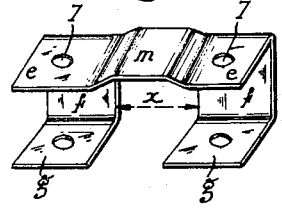
INVENTOR:
ANTONIN GUSTAVE HANESSE
By Richardson, David and Nordon
ATTYS Sept. 23, 1952     A. G. HANESSE     2,611,160
DEVICE FOR ASSEMBLING STRUCTURAL ELEMENTS
Filed June 22, 1948     3 Sheets-Sheet 2

INVENTOR:
ANTONIN GUSTAVE HANESSE
By
Richardson, David and Nordon
Atty's

Sept. 23, 1952 A. G. HANESSE 2,611,160
DEVICE FOR ASSEMBLING STRUCTURAL ELEMENTS
Filed June 22, 1948 3 Sheets-Sheet 3

INVENTOR:
ANTONIN GUSTAVE HANESSE
By
Richardson, David and Nordon
Attys

Patented Sept. 23, 1952

2,611,160

UNITED STATES PATENT OFFICE 2,611,160

DEVICE FOR ASSEMBLING STRUCTURAL ELEMENTS

Antonin Gustave Hanesse, Saint-Raphael, France

Application June 22, 1948, Serial No. 34,496
In France June 23, 1947

3 Claims. (Cl. 20—92)

The present invention has for its object to provide a device for assembling bars or rigid members, and more especially members forming the framework of full-size or reduced size (toy) collapsible structures.

Said device, which is simple to construct and enables very strong rigid assemblies to be obtained quickly, is remarkable in particular in that it comprises in combination two fittings, one of which is provided with means for fixing it to a bar or is integral with same, and with means for hooking it to a second bar, whereas the other fitting is so designed as to lock the second bar in the first fitting.

This assembling device makes it possible to dispense with the use of nails, or tongues and grooves for assembling wooden frameworks, or with the use of rivets or of welding for assembling iron frameworks. Furthermore, it makes it possible, for a light structure, to replace the expert fitter by a minimum amount of unskilled labour, thereby improving the conditions of the structure as regards standardization, speed and economy.

The invention makes it possible to construct frameworks which can be easily and quickly taken to pieces or transformed and which provide multiple combinations. Furthermore, it facilitates the erection of buildings on uneven ground.

Other features and advantages will become apparent from the ensuing description.

In the accompanying drawing which is given solely by way of example:

Fig. 1 shows a perspective view of an embodiment of the assembling device adapted to join together two bars located at right angles, the two fittings being shown in the assembling position and the bars to be joined together not being shown;

Fig. 2 is a similar view with the two bars;

Fig. 3 shows an elevational view of the hooking fitting of the device;

Fig. 4 is a bottom plan view thereof;

Fig. 5 shows a perspective view of the hooking fitting.

Fig. 6 shows a plan view of the original blank which, after bending, provides the hooking fitting;

Figs. 7 and 8 show a front and a side elevation of the locking fitting;

Fig. 9 shows a perspective view of the same locking fitting;

Figure 10:
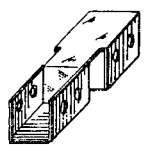
Figs. 10 and 11 show a modification of construction of the hooking fitting.

According to the embodiment shown in Figs. 1 to 9 the assembling device comprises two fittings, one of which 1, forms a hooking fitting, the other, 2, a locking fitting. These two fittings are intended to join together two bars 3 and 4 arranged at right angles to one another, the assembly forming a T. Each of these solid or tubular bars may be of any usual square or circular cross-section, the end which is intended for assembling according to the invention being necessarily of square cross-section.

The one piece hooking fitting comprises (Figs. 3, 4, 5) a sheath of square cross-section having an upper face $a$, a lower face $c$ which has a gap 5, and two side faces $b$. The upper face $a$ is extended by a length equal to the side of the bar 4 to be hooked and terminates in a portion bent at right angles and forming with said upper face and the extreme edges of the other faces a saddle piece which is intended to straddle the bar 4.

This fitting is obtained from the blank shown in Fig. 6 in which the various lines of fold are shown in dotted lines.

The fitting 1 is preferably provided with opposite holes 6 in the faces $b$ thereof.

As regards the locking fitting shown in Figs. 7, 8, 9 it comprises two symmetrical U-shaped portions each having a bottom $f$ and two wings $e$ and $g$. The two U-shaped portions are spaced apart a distance $x$ equal to the external width 1 (Fig. 4) of the hooking fitting and are connected together by a medial bridge portion $m$ which is preferably higher than the wings $e$ of the U-shaped portions by an amount equal to the thickness of the metal plate of which the hooking fitting 1 is made.

Furthermore, this fitting is provided with opposite holes 7 in the wings of the U-shaped portions.

The method of using this assembling device is as follows:

First the bar 3 is engaged by its square end in the sheath formed by the fitting 1, then the saddle piece of said fitting is engaged over the other bar 4 at an intermediate point of said bar where the assembly is to be formed. The other fitting 2 is then engaged by its medial notch over the first fitting, next to the bar 4, and is inserted, in the direction of the arrow $f^1$ (Fig. 2) until the medial bridge portion $m$ comes into contact with the face $a$ of the first fitting. It is then only necessary to slide the second fitting sideways in the direction of the arrow $f^2$ of Fig. 2 in order finally to bring it into the position of the said Fig. 2, in which position the two wings laterally straddle the bar 4 and surround the saddle piece of the fitting 1 which is thus locked.

In order to take the assembly to pieces, it is only necessary to effect the reverse movements.

The holes 6 and 7 are intended to receive bolts, screw-threaded rods or the like 8 and 9 which are held by means of nuts and also pass through the bars 3 and 4. Said bolts or rods are intended to increase the rigidity of the assembly by forming an additional connection and in particular to prevent its sliding over the parts to be assembled.

Naturally, the above-described fittings can be subjected to numerous other modifications and consequently permit of a large number of combinations. Some of these will be described hereinafter.

Figure 11:
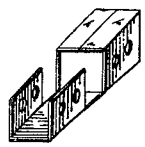

In Figs. 10 and 11, a hooking fitting has been shown which is provided with a second sheath which is located in alignment with the first, is integral with the fitting and is intended to receive an additional framework part comprised in the assembly.

Figure 12:
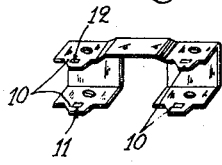
Fig. 12 shows a modification of the locking fitting in which a clamping device by means of keys is provided. Said device is shown in transverse section in Fig. 13.
Figure 13:
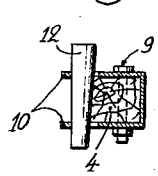

According to the example shown in Figs. 12 and 13 the wings of the locking fitting 2 are provided with lugs 10 provided with opposite holes 11 which are adapted to accommodate clamping keys 12 intended to wedge the bar 4 without any possibility of play in the bottom of the two wings formed by the locking fitting 2.

Figure 14:
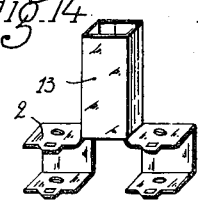
Figs. 14 to 17 show modifications of construction of the locking fitting of the above type.

In Fig. 14 a locking fitting has been shown which is adapted to receive an additional part by means of a sheath 13 similar to that of the hooking fitting 1 and integral with said locking fitting 2 or welded thereto.

Figure 15:
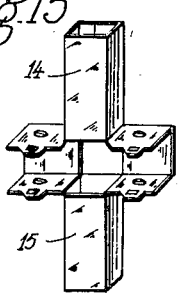

In Fig. 15, the locking fitting is provided with two similar symmetrical sheaths 14 and 15.

Figure 16:
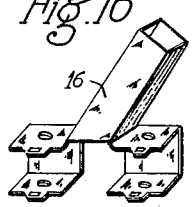

Fig. 16 shows another modification in which the sheath 16 added to the locking fitting 2 is oblique with respect to the faces of said fitting but the axis of said sheath is at right angles to the axis of the sheath of the hooking fitting not shown and to the framework part engaged in the sheath of said hooking fitting.

Figure 17:
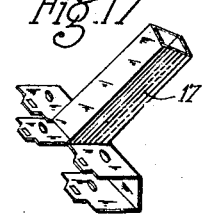

In the modification of Fig. 17, the axis of the additional sheath 17 is oblique with respect to the axis of the sheath of the hooking fitting not shown, and at right angles with respect to the axis of the framework part hooked in the saddle piece of said hooking fitting.

As already stated, the various hooking and locking fittings can be combined according to the assembly to be obtained.

Figure 22:
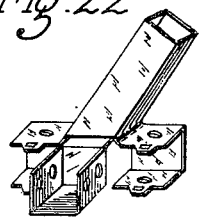
Figure 23:
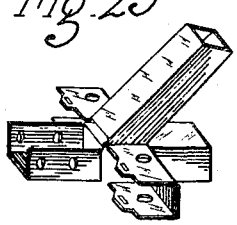
Figure 24:
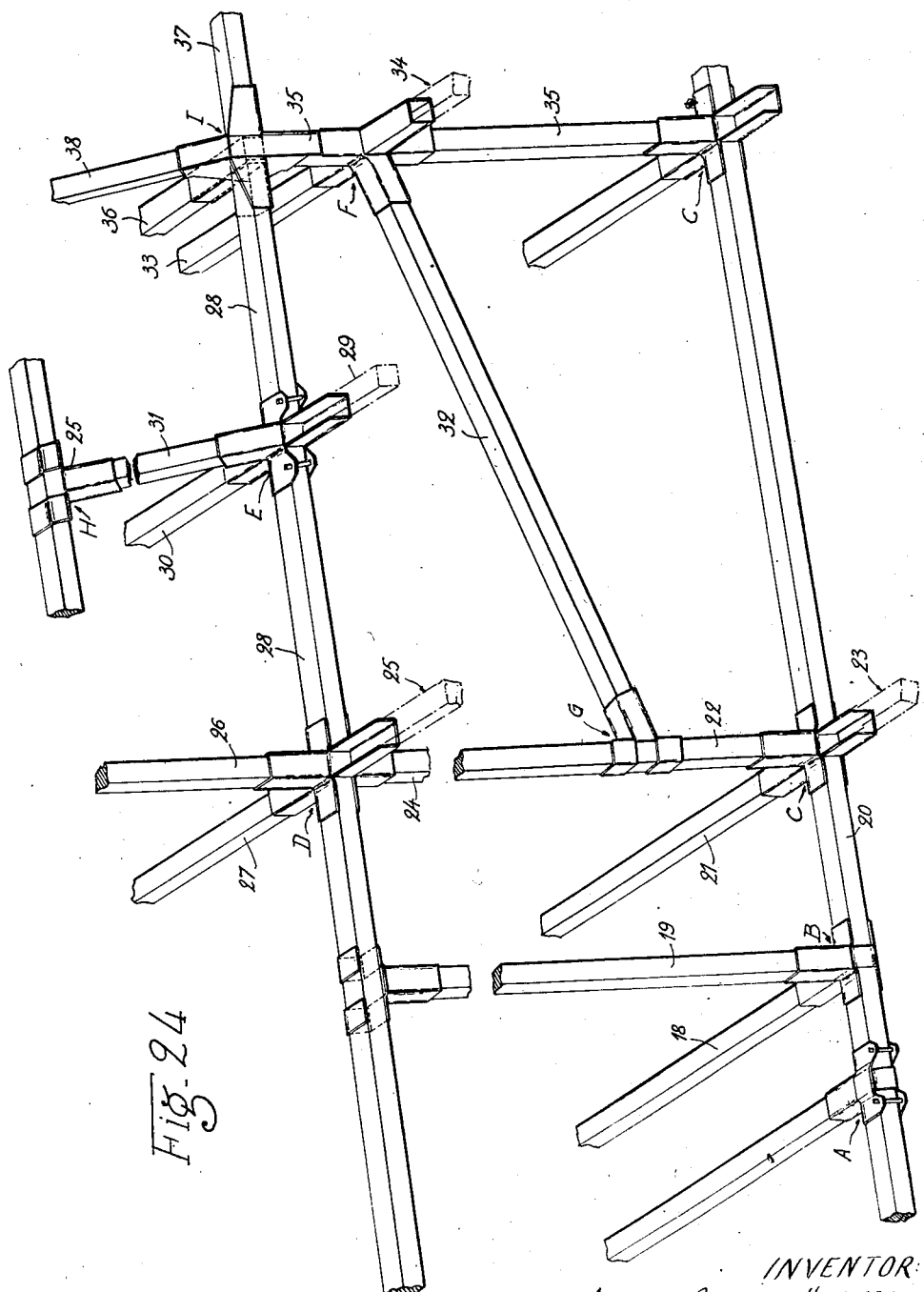
Fig. 24 shows an example of the application of various modifications of the device to a framework.

Some of these combinations are shown in Figs. 18 to 23 and also in Fig. 24 which shows a framework assembly obtained by means of the invention.

In this Fig. 24 the simple assembly of Figs. 1 and 2 is shown at A.

Figure 18:
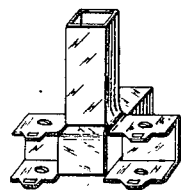
Figs. 18 to 23 show modifications of the assembling device, each of said modifications comprising a combination of two of the modifications of the previous fittings.

The assembly shown in Fig. 18 and at B (Fig. 24) enables two parts to be abutted at any point of a third part 20, the axes of the three parts forming a trihedron with three right angles.

Figure 19:
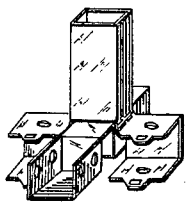
Figure 20:
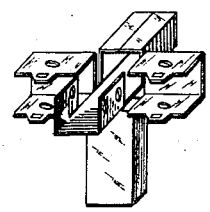

The assembly shown in Figs. 19 and 20 and at C (Figs. 24) enables three parts 21, 22, 23, to be abutted at any point of a fourth part 20 at right angles to one another.

Figure 21:
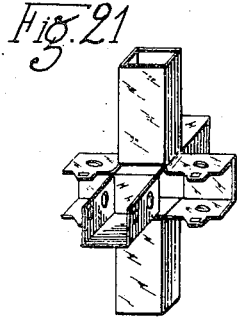

The assembly shown in Fig. 21 and at D (Fig. 24) enables four parts, 24, 25, 26, 27 to be abutted against any point of a fifth part 28 at right angles to one another.

Fig. 22 shows the assembly E of Fig. 24 which enables three parts 29, 30, 31, one of which (31) is oblique with respect to the two previous ones 29 and 30 to be abutted against any point of another part 28.

Finally, Fig. 23 shows the assembly F of Fig. 24 according to which three bars 32, 33, 34, are abutted against a fourth bar 35 and one of the three, 32, is oblique with respect to said fourth bar 35.

In Fig. 24, the assemblies G and H have only been partly shown without the hooking fittings for other framework elements not shown.

Furthermore, in this Fig. 24, a single fitting is shown at I of a type not hereinbefore described and which is intended to enable five parts 28, 35, 36, 37, 38 to be abutted together in a particularly rigid manner, this fitting which is formed by a series of jaws secured to one another, not being provided with any locking elements.

Finally, it may again be mentioned that the assembling fittings may be integral with at least one of the framework parts to be assembled, thereby decreasing the number of fixing bolts or wedging keys that have to be used.

Having now described my invention what I claim as new and desire to secure by Letters Patent is:

1. An assembling device for assembling structural elements of generally rectangular cross-section, comprising in combination a single hook member of U-shaped formation fitting on a continuous structural element and engaging three sides thereof and having means for rigidly connecting said member with another element at an angle with said first-mentioned element, and a double hook member comprising two parallel aligned U-shaped hooks fitting on said first mentioned element on both sides of said single hook-member and engaging three sides thereof and a bridge portion rigidly connecting said parallel hooks substantially in the plane containing two wings of the U-shaped hooks thereof, said double hook member straddling over said single hook member in such a position that said bridge bears against the bottom of said U-shaped single hook member and that said hook members build up a tubular guide engaging all faces of said first-mentioned element.

2. An assembling device as claimed in claim 1 wherein the inner wall of said bridge member is offset with respect to the inner walls of the adjacent integral wings of said U-shaped hooks by a distance corresponding to the thickness of the bottom of the U-shaped hook of said single hook member.

3. A skeleton structure comprising in combination a continuous bar having a generally rectangular cross-section, a cross-bar assembled at an angle with said continuous bar at a point intermediate the ends thereof, said cross bar ending in a single hook member having a U-shaped hook fitting on said continuous bar and engaging three sides thereof and having means for rigidly connecting said member to said crossbar; and a double hook member comprising two parallel hooks having aligned U-shaped notches fitting on said continuous bar on both sides of said single hook member and engaging three sides thereof and a bridge portion rigidly connecting said parallel hooks substantially in the plane containing two wings of the U-shaped notches thereof, said double hook member straddling over said single hook member in such a position that said bridge portion engages the bottom of said U-shaped single hook member, and that said hook members build up a tubular guide engaging all faces of said continuous bar.

ANTONIN GUSTAVE HANESSE.

REFERENCES CITED

The following references are of record in the file of this patent:

UNITED STATES PATENTS

| Number | Name | Date |
|---|---|---|
| 1,258,147 | Sargent | Mar. 5, 1918 |
| 1,611,078 | Robson | Dec. 14, 1926 |
| 1,789,280 | Armstrong | Jan. 13, 1931 |
| 2,016,702 | Bauer | Oct. 8, 1935 |

FOREIGN PATENTS

| Number | Country | Date |
|---|---|---|
| 377,175 | France | July 2, 1907 |